(12) United States Patent
Suzuki

(10) Patent No.: US 10,148,832 B2
(45) Date of Patent: Dec. 4, 2018

(54) IMAGE FORMING APPARATUS WITH PROJECTOR TO DISPLAY AN IMAGE TO BE PRINTED AND RELATED METHOD

(71) Applicants: KABUSHIKI KAISHA TOSHIBA, Tokyo (JP); TOSHIBA TEC KABUSHIKI KAISHA, Tokyo (JP)

(72) Inventor: Ryo Suzuki, Fuji Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/410,362

(22) Filed: Jan. 19, 2017

(65) Prior Publication Data

US 2018/0205839 A1    Jul. 19, 2018

(51) Int. Cl.
*H04N 1/00*   (2006.01)
*H04N 1/04*   (2006.01)

(52) U.S. Cl.
CPC ....... *H04N 1/00267* (2013.01); *H04N 1/0044* (2013.01); *H04N 1/00381* (2013.01); *H04N 1/00474* (2013.01); *H04N 1/00482* (2013.01); *H04N 1/04* (2013.01); *H04N 2201/0094* (2013.01)

(58) Field of Classification Search
CPC .................................................. H04N 1/00615
See application file for complete search history.

(56) References Cited

U.S. PATENT DOCUMENTS

| | | | |
|---|---|---|---|
| 8,659,767 B2 | 2/2014 | Iwase et al. | |
| 2013/0016396 A1* | 1/2013 | Ohara | G06F 3/1204 |
| 2015/0268730 A1* | 9/2015 | Walline et al. | G06F 3/017 |
| 2016/0378330 A1* | 6/2016 | Hisada et al. | G06F 3/04883 |
| 2017/0054874 A1* | 2/2017 | Oe | H04W 76/10 |

* cited by examiner

*Primary Examiner* — Lennin Rodriguezgonzalez
(74) *Attorney, Agent, or Firm* — Patterson & Sheridan LLP

(57) ABSTRACT

An image forming apparatus according to an embodiment includes a projector that projects an image onto a predetermined projection area outside of the image forming apparatus, an interface, a printer, and a processor. The printer prints an image on an image recording medium based on image data acquired the image acquired through the interface. The processor controls the projector to display the image to be printed on the projection area.

12 Claims, 3 Drawing Sheets

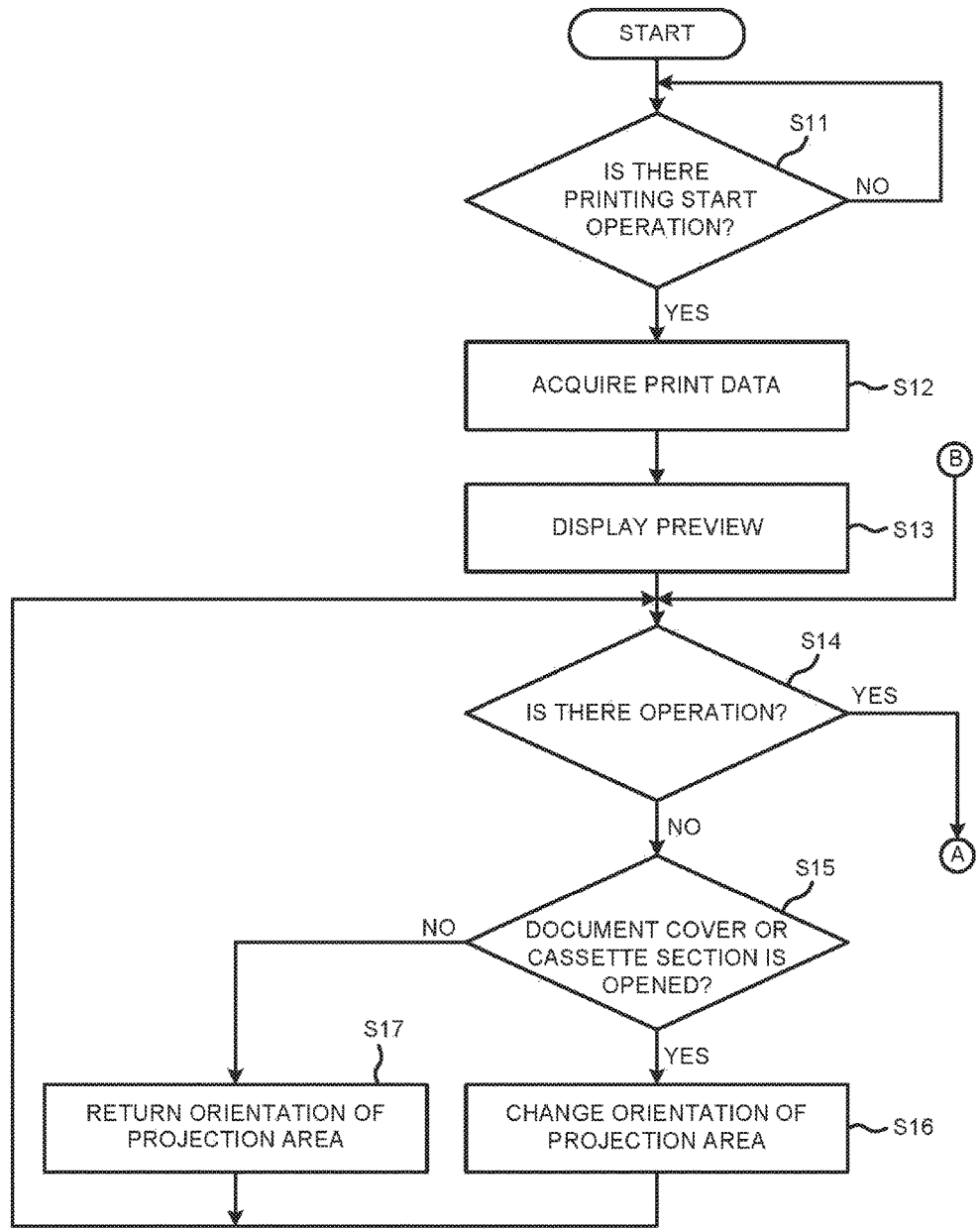

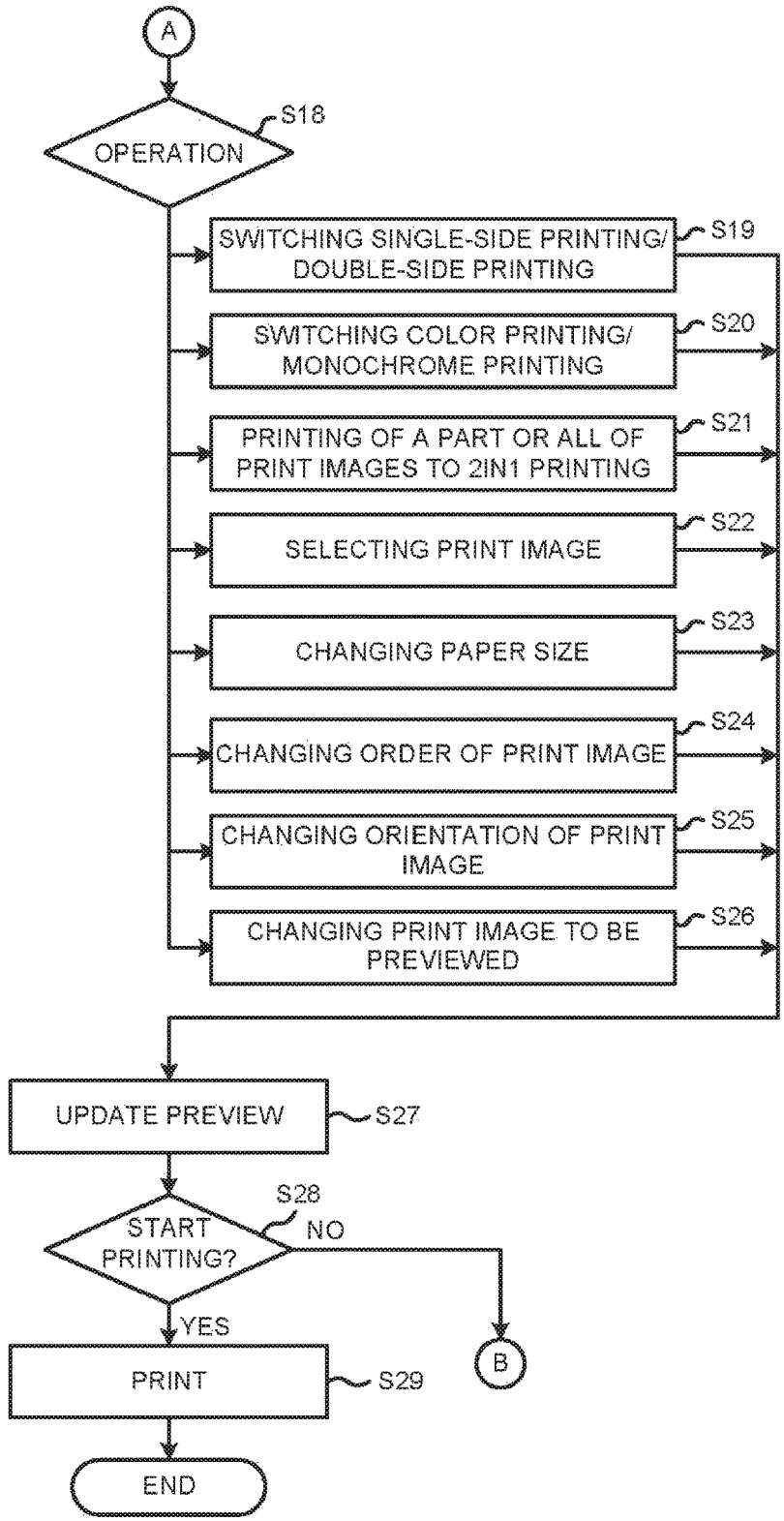

IMAGE FORMING APPARATUS WITH PROJECTOR TO DISPLAY AN IMAGE TO BE PRINTED AND RELATED METHOD

FIELD

Embodiments described herein relate generally to an image forming apparatus and an image forming method.

BACKGROUND

An image forming apparatus such as an MFP (Multifunction peripheral) includes a preview function for displaying, on a display device, a scanned image, a printed image and a finished image to preview the image to be printed according to print setting(s).

However, a size or a shape of an image displayed on the display device may be restricted. Thus, it is difficult for the image forming apparatus to display a preview screen that accurately displays the preview of the image to be printed.

DESCRIPTION OF THE DRAWINGS

FIGS. 3 and 4 are flowcharts illustrating an example sequence of operations of the image forming apparatus according to the embodiment.

DETAILED DESCRIPTION

In accordance with an embodiment, an image forming apparatus includes a projector that projects an image onto a predetermined projection area outside of the image forming apparatus, an interface, a printer, and a processor. The printer prints an image on an image recording medium based on image data acquired the image acquired through the interface. The processor controls the projector to display the image to be printed on the projection area.

Hereinafter, the embodiment is described with reference to the accompanying drawings.

Figure 1:
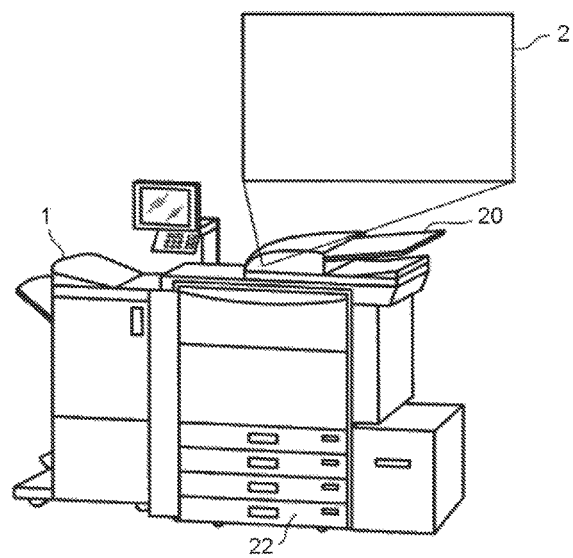
FIG. 1 is an overall view illustrating an example of an image forming apparatus according to an embodiment.

FIG. 1 is an overall view illustrating an example of an image forming apparatus 1 according to the embodiment.

The image forming apparatus 1 prints an image on a paper (image recording medium) in accordance with an operation by a user. For example, the image forming apparatus 1 acquires print data from an external device or a scanner in connection with receiving an operation for starting printing from the user. The image forming apparatus 1 forms the image on the paper in accordance with the acquired image data.

The image forming apparatus 1 projects a preview of the image to be printed before start of the printing onto a predetermined projection area outside of the image forming apparatus 1. In the example shown in FIG. 1, the image forming apparatus 1 displays the preview of the image on a projection area 2.

As shown in FIG. 1, the image forming apparatus 1 includes a document cover 20 and a cassette 22. The document cover 20 and the cassette 22 are described later.

An example configuration of the image forming apparatus 1 is now described.

Figure 2:
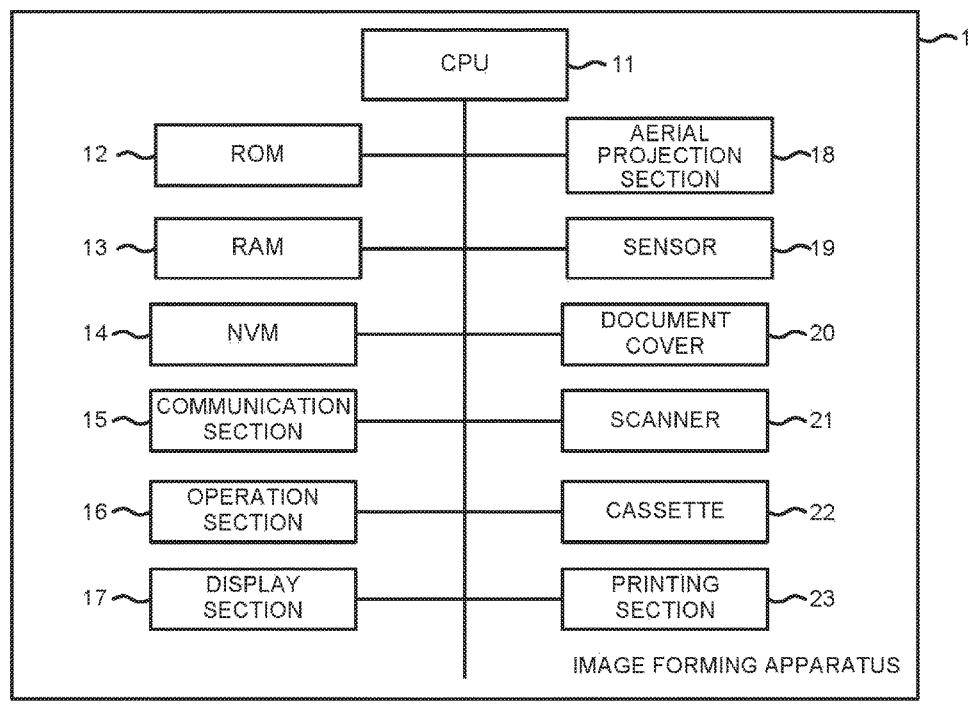
FIG. 2 is a block diagram illustrating an example configuration of the image forming apparatus.

FIG. 2 is a block diagram illustrating the example configuration of the image forming apparatus 1.

As shown in FIG. 2, the image forming apparatus 1 includes, as basic components, a CPU 11, a ROM 12, a RAM 13, a non-volatile memory (NVM) 14, a communication section 15, an operation section 16, a display section 17, an aerial projection section 18 (projector), a sensor 19, the document cover 20, a scanner 21, the cassette 22, a printing section 23 (printer) and the like. These sections are connected with each other via a data bus line. Furthermore, the image forming apparatus 1 may include components other than the components shown in FIG. 2 as necessary, or exclude a specific component.

The CPU 11 (processor) has a function of controlling the operation of the whole image forming apparatus 1. The CPU 11 maybe equipped with an internal cache and various interfaces. The CPU 11 realizes various processing through executing programs stored in an internal memory, the ROM 12 or the NVM 14 in advance.

Furthermore, various functions realized through executing the programs by the CPU 11 may be performed through a hardware circuit. In this case, the CPU 11 controls the function performed through the hardware circuit.

The ROM 12 is a nonvolatile memory in which programs for control and control data are stored in advance. The control program and control data are stored in the ROM 12 in advance according to specifications of the image forming apparatus 1. The ROM 12 stores, for example, a program for controlling a circuit substrate (for example, BIOS) of the image forming apparatus 1.

The RAM 13 is a volatile memory. The RAM 13 temporarily stores data being processed by the CPU 11. The RAM 13 stores various application programs on the basis of a command from the CPU 11. Further, the RAM 13 may store data necessary for executing the application program and an execution result of the application program.

The NVM 14 is a nonvolatile memory capable of writing and rewriting data. The NVM 14 is, for example, a hard disk, an SSD, an EEPROM® technology or a flash memory. The NVM 14 stores a control program, an application program and various kinds of data according to the operation and the application of the image forming apparatus 1.

The communication section 15 is an interface for transmitting and receiving data to and from an external device such as a PC. For example, the communication section 15 is an interface that supports a wired LAN or a wireless LAN.

Various operation instructions are input to the operation section 16 by an operator of the image forming apparatus 1. The operation section 16 sends a signal of an operation instruction input by the operator to the CPU 11. The operation section 16 is, for example, a keyboard, a numeric keypad and/or a touch panel.

The display section 17 is a display device that displays various information, and is controlled by the CPU 11. The display section 17 is, for example, a liquid crystal monitor or the like. Furthermore, in a case in which the operation section 16 includes the touch panel, the display section 17 and the operation section 16 may be integrally formed.

The aerial projection section 18 projects an image onto a predetermined area outside of the image forming apparatus 1, based on a signal from the CPU 11. The aerial projection section 18 projects an image onto the projection area 2. The aerial projection section 18 can change an orientation of the projection area 2 based on a signal from the CPU 11. For example, the aerial projection section 18 can incline the projection area 2 by a predetermined angle with respect to vertical. For example, the aerial projection section 18 can shift the projection area 2 downward.

The sensor 19 detects an operation input to the projection area 2. For example, the sensor 19 detects a touch operation on an icon displayed on the projection area 2. The sensor 19 may detect an operation such as drag, pinch and swipe to the projection area 2. The sensor 19, for example, may detect a finger entering in the projection area 2 using a laser. The configuration of the sensor 19 is not limited to a specific configuration.

The document cover 20 is arranged on an upper surface of a housing of the image forming apparatus 1 and covers a document read by the scanner 21 and a document table on which the document is arranged. For example, the document cover 20 is attached to the housing of the image forming apparatus 1 with one side rotatable about a fixed second side. The document cover 20 exposes the document if the rotatable side is raised by a user.

The document cover 20 is equipped with a detection section for detecting whether the document cover 20 is in an opened state or a closed state. The detection section transmits a signal to the CPU 11 indicating whether the document cover 20 is in the opened state or the closed state.

The scanner 21 reads the document arranged on the document table formed on the housing of the image forming apparatus 1 according to a signal from the CPU 11. For example, the scanner 21 is equipped with a carriage for reading an image in a horizontal scanning direction of the document. The scanner 21 moves the carriage in a vertical scanning direction of the document to read the image from the document. The scanner 21 transmits the read image to the CPU 11.

The cassette 22 houses the paper on which the image is printed. The cassette 22 is arranged at a lower portion of the image forming apparatus 1. The cassette 22 includes a stacking section for stacking the paper inside. The cassette 22 slides towards a front surface direction of the image forming apparatus 1 to be opened so that the stacking section is exposed to the outside.

The cassette 22 includes a detection section for detecting whether the cassette 22 is in an opened state or a closed state. The detection section transmits a signal indicating whether the cassette 22 is in the opened state or the closed state to the CPU 11.

The printing section 23 prints the image on the paper conveyed from the cassette 22 on the basis of a signal from the CPU 11. For example, the printing section 23 prints the image on the paper with an electrophotographic system or an inkjet system. The configuration of the printing section 23 is not limited to a specific configuration.

Furthermore, the image forming apparatus 1 may include a plurality of cassettes. For example, the image forming apparatus 1 may include different cassettes for housing papers with different sizes.

Next, the function performed by the CPU 11 is described. The CPU 11 acquires an image (print image) to be printed on the paper. For example, the CPU 11 receives an operation for starting a printing operation via the operation section 16. In response to receiving the operation for starting the printing operation, the CPU 11 acquires the print data from an external device such as a PC via the communication section 15 or print data from the scanner 21 as the print image. For example, the communication section 15 or the scanner 21 functions as an interface for acquiring the print image.

The CPU 11 controls the aerial projection section 18 to display a preview of the image (print image) to be printed on the paper onto the projection area 2 by using. For example, the CPU 11 controls the aerial projection section 18 to display the print image on the basis of the print data on the projection area 2.

For example, the CPU 11 controls the aerial projection section 18 to display the print image at a predetermined area in the projection area 2. For example, the CPU 11 controls the aerial projection section 18 to display a full-size image illustrating a state in which the print image is printed on the paper at the predetermined area in the projection area 2.

Furthermore, the CPU 11 may control the aerial projection section 18 to display a plurality of print images on the projection area 2 in a case in which there is a plurality of print images. The CPU 11 may control the aerial projection section 18 to display a part of the print images on the projection area 2. The CPU 11 may control the aerial projection section 18 to display the full-size image illustrating a state in which the image is printed on the paper for one part of the print images and to display a smaller image indicating a state in which the image is printed on the paper for the other part of the print images on the projection area 2.

The CPU 11 receives an operation relating to the print setting from the sensor 19. For example, the CPU 11 controls the aerial projection section 18 to display a variety of icons on the projection area 2. For example, the icons include an icon for switching between single-side printing and double-side printing, an icon for switching between color printing and monochrome printing, an icon for switching between 1in1 printing and 2in1 printing, an icon for selecting a paper size, and the like.

The CPU 11 determines whether or not various icons are touched via the sensor 19. The CPU 11 receives an operation relating to the print setting according to the touched icon.

The CPU 11 receives the operation relating to the print setting according to an operation of the finger of the user. For example, the CPU 11 detects the operation of the finger such as drag, pinch or swipe via the sensor 19. For example, the CPU 11 receives an operation for changing an order of the print image through the drag. The CPU 11 receives an operation for selecting the paper size through the pinch. The CPU 11 receives an operation for selecting the image to be printed or changing the print image to be previewed through the swipe.

For example, the CPU 11 receives operations such as an operation for switching between single-side printing and double-side printing, an operation for switching between color printing and monochrome printing, an operation for switching the printing of a part or all of a plurality of the print images between 1in1 and 2in1 printing, an operation for selecting the print image, an operation for selecting the paper size, an operation for changing the order of the print image, an operation for changing the orientation of the print image, or an operation for changing the print image to be previewed as operations relating to the print setting through touching one icon or through the operation of the finger. Furthermore, the CPU 11 is not limited to receiving an operation for switching the printing of a part or all of a plurality of the print images to 2in1 printing, and may also receive an operation for switching the printing of a part or all of a plurality of the print images to Nin1 printing.

The CPU 11 determines whether the document cover 20 is opened or the cassette 22 is opened. For example, the CPU 11 determines whether a signal indicating the document cover 20 is in the opened state is received from the document cover 20 or a signal indicating whether the cassette 22 is in the opened state from the cassette 22.

The CPU 11 changes the orientation of the projection area 2 by controlling the aerial projection section 18 if it is determined that the document cover 20 is opened or the cassette 22 is opened.

For example, the CPU 11 changes the orientation of the projection area 2 so that the projection area 2 is not formed between the user and the document table if it is determined that the document cover 20 is in the opened state. For example, the CPU 11 rotates the projection area 2 by a predetermined angle with respect to vertical.

The CPU 11 changes the orientation of the projection area 2 so that the user who puts the paper in the cassette 22 can easily see a state of the paper if it is determined that the cassette 22 is in the opened state. For example, the CPU 11 inclines the projection area 2 downward.

Furthermore, the CPU 11 may change the orientation of the projection area 2 in the same way when it is determined that the document cover 20 is opened and when it is determined that the cassette 22 is opened. The method by the CPU 11 for changing the orientation of the projection area 2 is not limited to a specific method.

Next, an example of the operation of the CPU 11 is described in connection with FIGS. 3 and 4. First, the CPU 11 determines whether or not the operation for starting the printing is received via the operation section 16 (ACT S11). If it is determined that the operation for stating the printing is not received (No in ACT S11), the CPU 11 returns to the processing in ACT S11.

If it is determined that the operation for starting the printing is received (Yes in ACT S11), the CPU 11 acquires the print data (ACT S12). When the print data is acquired, the CPU 11 controls the aerial projection section 18 to display the preview of the print image based on the basis of the print data at a predetermined area of the projection area 2 (ACT S13).

When the preview is displayed, the CPU 11 determines whether or not an operation relating to the print setting is received via the sensor 19 (ACT S14). If it is determined that the operation relating to the print setting is not received (No in ACT S14), the CPU 11 determines whether or not the document cover 20 is opened or the cassette 22 is opened (ACT S15).

If it is determined that the document cover 20 is opened or the cassette 22 is opened (Yes in ACT S15), the CPU 11 changes the orientation of the projection area 2 to be different than an initial state (ACT S16). If it is determined that the document cover 20 is not opened and the cassette 22 is not opened (No in ACT S15), the CPU 11 sets the orientation of the projection area 2 as the initial state (ACT S17).

After the orientation of the projection area 2 is changed to be different than the initial state (ACT S16), or after the orientation of the projection area 2 is set as the initial state (ACT S17), the CPU 11 returns to the processing in ACT S14.

If the operation relating to the print setting is received (Yes in ACT S14), the CPU 11 determines a content of the received operation (ACT S18).

If the content of the operation is determined, the CPU 11 operates on the basis of the determined content of the operation. For example, the CPU 11 carries out any one of an operation for switching between single-side printing and double-side printing (ACT S19), an operation for switching between color printing and monochrome printing (ACT S20), an operation for switching the printing of a part or all of a plurality of the print images between 1in1 and 2in1 printing (ACT S21), an operation for selecting the print image (ACT S22), an operation for selecting the paper size (ACT S23), an operation for changing the order of the print image (ACT S24), an operation for changing the orientation of the print image (ACT S25), and an operation of changing the print image to be previewed (ACT S26).

When any one of the operations in ACT S19 to ACT S26 is received, the CPU 11 updates the preview of the print image on the projection area 2 (ACT S27). After the preview is updated, the CPU 11 determines whether or not the operation for starting the printing is received (ACT S28). Furthermore, the CPU 11 may receive the operation for starting of the printing via the operation section 16, or receive an operation for starting the printing via the sensor 19.

If it is determined that the operation for starting the printing is not received (No in ACT S28), the CPU 11 returns to the processing in ACT S14. Furthermore, the CPU 11 may determine that the operation for starting the printing is not received if an operation for starting the printing is not received within a predetermined period of time. The CPU 11 may determine that the operation for starting the printing is not received if receiving an operation other than the printing start operation.

If it is determined that the operation for starting the printing is received (Yes in ACT S28), the CPU 11 controls the printing section 23 to print the print image on the paper (ACT S29). When the print image is printed on the paper, the CPU 11 terminates the operation.

Furthermore, the CPU 11 may control a conveyance section to discharge the printed paper to the outside. The CPU 11 may use the aerial projection section 18 to display the preview of the print image when the print data is acquired from the external device such as the PC via the communication section 15. The CPU 11 may display the preview of the print image when the image data is acquired via the scanner 21.

The image forming apparatus with the foregoing configuration can display the full-size image indicating the state in which the print image will be printed on the paper on the projection area formed in the air before the image is printed on the paper. As a result, the image forming apparatus can display the finished image in an easy to understand manner.

The image forming apparatus receives the operation of the finger such as the drag, the pinch, and the swipe on the projection area to receive the operation relating to the print setting. Thus, the image forming apparatus can receive the operation relating to the print setting while displaying the print image to the user. As a result, the image forming apparatus can supply an intuitive operation to the user.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:
1. An image forming apparatus, comprising:
   a projector configured to project an image onto a predetermined projection area outside of the image forming apparatus;
   an interface;

a cassette configured to house an image recording medium on which an image is to be printed;

a printer configured to print an image on the image recording medium based on image data acquired through the interface; and a processor configured to:
control the projector to display the image to be printed on the projection area,
determine whether or not the cassette is opened, and
if the cassette is determined to be opened, control the projector to change the orientation of the image displayed on the projection area.

2. The image forming apparatus according to claim 1, wherein the processor controls the projector to display a full-size image indicating a state in which the image will be printed on the image recording medium.

3. The image forming apparatus according to claim 1, further comprising:
a sensor configured to detect an operation on the projection area, wherein
the processor performs a print setting operation based on the operation detected on the projection area by the sensor.

4. The image forming apparatus according to claim 3, wherein the detected operation on the projection area is at least one of drag, pinch and swipe.

5. The image forming apparatus according to claim 4, wherein the print setting operation based on the detected operation includes at least one of:
an operation for switching between single-side printing and double-side printing,
an operation for switching between color printing and monochrome printing,
an operation for switching printing of a part or all of a plurality of print images to Nin1 printing,
an operation for selecting one or more images for printing among a plurality of images,
an operation for selecting a size of the image forming medium on which the image is to be printed by the printer,
an operation for changing an order of the print image,
an operation for changing an orientation of the image to be printed, and
an operation for changing the image displayed by the projector from among a plurality of images.

6. The image forming apparatus according to claim 1, wherein the image data is acquired through the interface from one of a scanner and an external device.

7. A method of forming an image with an image forming apparatus, including the steps of:
generating, in the image forming apparatus, an image for printing;
displaying, with a projector operably connected to the image forming apparatus, the image on a projection area outside of the image forming apparatus;
determining whether or not a cassette that holds image recording media is opened; and
if the cassette is determined to be opened, changing the orientation of the image displayed on the projection area; and
printing the image in accordance with the displayed image.

8. The method according to claim 7, wherein the projector displays a full-size image indicating a state in which the image will be printed on the image recording medium.

9. The method according to claim 7, further comprising the steps of:
detecting an operation on the projection area, and
performing a print setting operation based on the operation detected on the projection area.

10. The method according to claim 9, wherein the detected operation on the projection area is at least one of drag, pinch and swipe.

11. The method according to claim 10, wherein the print setting operation based on the detected operation includes at least one of:
an operation for switching between single-side printing and double-side printing,
an operation for switching between color printing and monochrome printing,
an operation for switching printing of a part or all of a plurality of print images to Nin1 printing,
an operation for selecting one or more images for printing among a plurality of received images,
an operation for selecting a size of an image forming medium on which the image is to be printed,
an operation for changing an order of a plurality of received images to be printed,
an operation for changing an orientation of the image to be printed, and
an operation for changing the image displayed by the projector from among a plurality of received images.

12. The method according to claim 7, wherein image data from which the image is generated is received from one of a scanner and an external device.

* * * * *